US008283038B2

(12) United States Patent
Choi et al.

(10) Patent No.: US 8,283,038 B2
(45) Date of Patent: Oct. 9, 2012

(54) LAYERED STRUCTURE INCLUDING GRAPHENE AND AN ORGANIC MATERIAL HAVING A CONJUGATED SYSTEM, AND METHOD OF PREPARING THE SAME

(75) Inventors: Jae-young Choi, Suwon-si (KR);
Do-hwan Kim, Anyang-si (KR);
Soo-ghang Ihn, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/917,245

(22) Filed: Nov. 1, 2010

(65) Prior Publication Data

US 2011/0104507 A1 May 5, 2011

(30) Foreign Application Priority Data

Nov. 2, 2009  (KR) .................. 10-2009-0104985

(51) Int. Cl.
*B32B 9/00* (2006.01)
(52) U.S. Cl. ...................................... 428/408; 423/448
(58) Field of Classification Search .................. 428/408;
423/447.1, 447.2; 977/742
See application file for complete search history.

(56) References Cited

U.S. PATENT DOCUMENTS

| 2005/0181212 A1* | 8/2005 | Schaepkens et al. ...... 428/411.1 |
| 2009/0029221 A1 | 1/2009 | Goddard et al. |
| 2011/0033746 A1* | 2/2011 | Liu et al. ..................... 429/209 |

FOREIGN PATENT DOCUMENTS

| KR | 1020080061577 A | 7/2008 |
| WO | 2008046010 A2 | 4/2008 |

* cited by examiner

*Primary Examiner* — Maria Veronica Ewald
*Assistant Examiner* — Daniel H Miller
(74) *Attorney, Agent, or Firm* — Cantor Colburn LLP

(57) ABSTRACT

A layered structure including graphene, wherein a basal plane of the graphene is a (0001) plane; and a layer including an organic material having a conjugated system disposed on the graphene, wherein the layer comprising the organic material layer having the conjugated system is bound to the (0001) plane of the graphene by a π-π interaction, and a method of preparing the same.

12 Claims, 4 Drawing Sheets

US 8,283,038 B2

LAYERED STRUCTURE INCLUDING GRAPHENE AND AN ORGANIC MATERIAL HAVING A CONJUGATED SYSTEM, AND METHOD OF PREPARING THE SAME

CROSS-REFERENCE TO RELATED APPLICATIONS

This application claims priority to Korean Patent Application No. 10-2009-0104985, filed on Nov. 2, 2009, and all the benefits accruing therefrom under 35 U.S.C. §119, the content of which in its entirety is herein incorporated by reference.

BACKGROUND

1. Field

The present disclosure relates to layered structures including graphene and an organic material having a conjugated system, and a method for preparing the same. More particularly, a layered structure including graphene and an organic material having a conjugated system is disclosed, wherein the layered structure has a lower interfacial resistance due to fewer interfacial defects and is economically efficient to produce.

2. Description of the Related Art

Generally, graphite has a structure in which planar, two-dimensional ("2D") graphene sheets are stacked upon one another. In graphene, carbon atoms are linked to each other in a hexagonal configuration. Recently, extensive research on graphite has shown that graphene sheets separated from graphite have very useful characteristics and are unlike other materials.

The electrical characteristics of a graphene sheet at a given thickness vary according to the crystallographic orientation of the graphene sheet. Thus, a device having desired electrical characteristics may be designed by orienting the graphene sheet in a selected crystallographic orientation. Such graphene sheets may be effectively used in carbon-based electric devices or carbon-based electromagnetic devices.

However, when a device is manufactured by disposing an organic material layer on graphene, the interfacial structure of the graphene and the organic material layer may greatly affect the characteristics of the device. In addition, if charge transfer occurs between the graphene and the organic material layer, interfacial defects between the graphene and the organic material layer may cause interfacial resistance. Therefore, in order to more effectively utilize the excellent electrical characteristics of graphene, there is a need for a layered structure having fewer interfacial defects between the graphene and an organic material layer on the graphene.

SUMMARY

Provided is a layered structure including graphene and an organic material having a conjugated system, wherein the layered structure has a lower interfacial resistance due to fewer interfacial defects, and production of the layered structure is economically efficient.

Also provided is a method of preparing the layered structures including the graphene and the organic material having the conjugated system.

Further provided are various electronic devices including the layered material including graphene and the organic material having the conjugated system.

Additional aspects will be set forth in part in the description which follows and, in part, will be apparent from the description.

According to an aspect, a layered structure includes graphene, wherein a basal plane of the graphene is a (0001) plane; and a layer of an organic material having a conjugated system disposed on the graphene, wherein the layer comprising the organic material is bound to the (0001) plane of the graphene by a π-π interaction.

The organic material layer may have a face-on orientation in which a π electron band of the organic material is oriented parallel to the basal plane of the graphene.

The organic material layer may have a face-on orientation in which a π electron band of the organic material is oriented parallel to a (0001) plane of the graphene.

The organic material layer may include a self-assembled structure including the organic material having the conjugated system.

The organic material having the conjugated system may include a π electron system delocalized along a polymeric backbone thereof.

The organic material having the conjugated system may include at least one organic material selected from phthalocyanine, pentacene, oligothiophene, polythiophene, and polyphenylene.

The graphene may have a sheet form, including a surface having an area of equal to or greater than about 1 square millimeter.

According to another aspect, a method of preparing the layered structure including graphene and a layer of an organic material having a conjugated system includes coating a solution including the organic material having system on graphene to form the layer of the organic material having a conjugated system. The coating may be performed using a method selected from spin coating, dip coating, spraying, printing and casting and using a doctor blade.

According to another aspect, there is provided a method of preparing a layered structure including graphene and a layer of an organic material having a conjugated system, comprising vapor-depositing an organic, low molecular weight precursor material on the graphene under conditions effective to form the layer comprising the organic material having a conjugated system.

According to another aspect, an electrical device includes the layered structure including the graphene and the organic material having the conjugated system described above.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
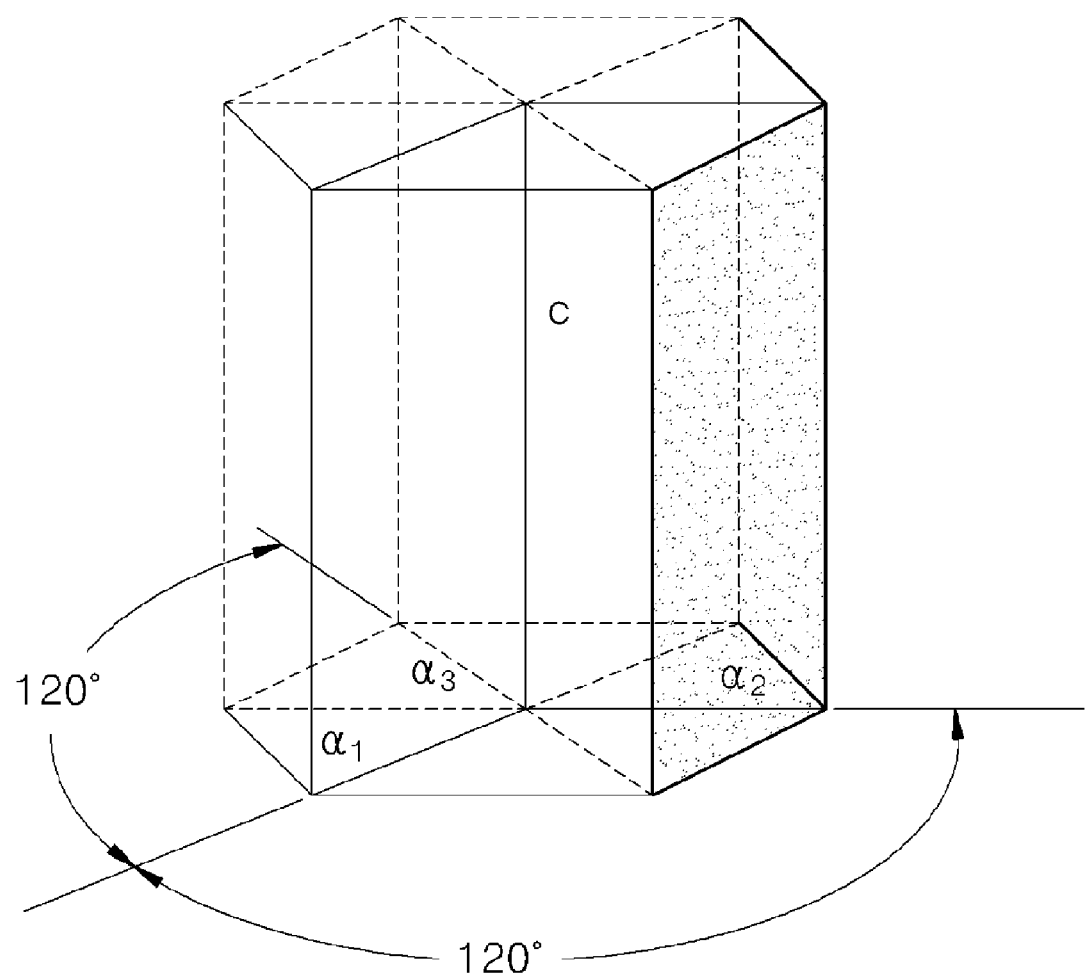
FIG. 1 is a schematic view which illustrates a plane index of a hexagonal structure.

Reference will now be made in further detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer, or section from another element, component, region, layer or section. Thus, a first element, component, region, layer, or section discussed below could be termed a second element, component, region, layer, or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs.

According to an aspect, a layered structure comprises graphene, wherein a basal plane of the graphene is a (0001) plane; and a layer of an organic material having a conjugated system disposed on the graphene, and wherein the layer comprising organic material having the conjugated system is bound to the (0001) plane of the graphene by a π-π interaction. In an embodiment, the organic material is bound to the basal plane of the graphene by a π-π interaction.

The term "graphene" as used throughout the specification refers to a polycyclic aromatic molecule consisting of a plurality of carbon atoms covalently bonded to each other. The covalently bonded carbon atoms may form a six-member ring as a repeating unit, and may further include at least one of a five-member ring and a seven-member ring. Thus, graphene comprises a single layer of covalently bonded carbon atoms having $sp^2$ hybridization. A plurality of graphene layers is often referred to in the art as graphite. However, for convenience, "graphene" as used herein may be a single layer, or also may comprise a plurality of layers of carbon. Thus the graphene may be formed as a single layer of graphene. Alternatively, the graphene may be formed to have multiple layers of graphene stacked upon one another. In this regard, the graphene may have a maximum thickness of about 100 nanometers (nm), specifically about 10 nm to about 90 nm, more specifically about 20 nm to about 80 nm.

A basic unit of the graphene is a six-member ring consisting of six carbon atoms. Such six-member rings are linked together to form a planar structure, and such planar structures of six-member rings may be stacked upon one another. This six-member ring structure is similar to a hexagonal structure, and thus the same plane index and orientation index as those of the hexagonal structure may be applied. Referring to FIG. 1, a unit cell of the hexagonal structure has the axes $a_1$, $a_2$, and $a_3$, which intersect at an angle of 120° relative to each other and are on a same plane, and a c axis which is perpendicular to the plane of the axes $a_1$, $a_2$, and $a_3$. Thus, the hexagonal structure has four plane indices and four orientation (i.e., direction) indices that correspond to the four axes. For example, for graphene that is a planar 2-dimensional structure, its basal plane consists of six-member rings having an index of (0001). Also, a surface of a material may correspond to a plane having a particular plane index. Thus, for example, a (0001) surface of a material is understood to refer to a surface corresponding to a (0001) plane.

"An organic material having a conjugated system" means a polymeric compound having a π electron system which is delocalized along the backbone of the polymer. While not wanting to be bound by theory, it is understood that the delocalized π electron system provides the polymer with semiconducting characteristics and the ability to support positive and negative charges. The positive and negative charges may have a high mobility along the backbone of the polymer.

Again without wanting to be bound by theory, it is known that the conducting and semiconducting characteristics of an organic material having a conjugated system can vary according to the orientation of the conjugated system. In addition, the organic material having the conjugated system has a preferred orientation due to the interaction of π electrons in the conjugated system. In polymeric materials having conjugated systems, the mechanisms of charge transport may be classified a (1) an intra-chain transport mechanism taking place within the conjugated system, (2) an inter-chain transport mechanism taking place between the conjugated systems, and (3) an inter-grain transport mechanism taking place between grains that have the conjugated systems. These mechanisms of charge transport are also referred to as hopping, band-like transport, and hopping and trapping, respectively. For example, for a semiconducting polymer material having a conjugated system, the band-like transport mechanism, which is an inter-chain transport mechanism, is known to be the fastest method of charge transport. Thus, in order to increase the charge carrier mobility of the semiconducting polymer material having the conjugated system, the conjugated system is desirably oriented in a direction to induce the band-like charge transport. When a polymeric material having a conjugated system is oriented in a manner such that a π-electron band of the polymer is parallel to a substrate, this is referred to as a "face-on orientation." Alternatively, if the π-electron band of the polymer is oriented perpendicular to the substrate, this is referred to as an "edge-on orientation." The more the polymer materials have the face-on orientation, the more that the band-like transport is likely to occur, and thus the charge transport efficiency is improved. In addition, the interfacial resistance is reduced.

In an embodiment, if the organic material layer, which comprises an organic material having the conjugated system, is layered on the graphene to be parallel thereto, the organic material having the conjugated system is more likely to be oriented in the face-on orientation and parallel to the plane of the graphene due to the interaction between π electron bands delocalized along the plane of the graphene and the π electron bands of the organic material having the conjugated system. Thus, the layered structure is more likely to have the face-on structure rather than the edge-on structure. In this embodiment, the mobility of charges in a vertical direction may be improved, for at least the reasons disclosed above. In addition, the organic material having the conjugated system and the graphene are also bound via π bonds at their interface, thus the interfacial resistance between the graphene and the organic material layer may be reduced.

In the layered structure, the layer comprising the organic material having the conjugated system may have a thickness of about 1 micrometer (μm), specifically about 0.001 μm to about 0.5 μm, more specifically about 0.01 μm to about 0.1 μm. The layer comprising the organic material having the conjugated system may be formed in the shape of, for example, a nanorod, a nanowire, or a nano-thin film. Thus, it is to be understood that "layer" as used herein encompasses any shape comprising the organic material having the conjugated system, provided that at least a portion of the organic material is disposed on and in contact with the graphene.

The organic material having the conjugated system that may bind to the (0001) basal plane of the graphene, may be any material that includes a delocalized π electron system, wherein the delocalized π electron system is preferably present along the backbone of the organic material. Examples of the organic material having the conjugated system include, but are not limited to, an organic low-molecular weight material, such as phthalocyanine, pentacene, or oligothiophene, and an organic high-molecular weight material, such as polythiophene or polyphenylene. The organic low-molecular weight material may have a molecular weight of about 100 Daltons to about 1000 Daltons, specifically about 150 to about 800 Daltons, more specifically about 200 Daltons to about 600 Daltons. The organic high-molecular weight material may have a molecular weight of about 1000 Daltons to about 1,000,000 Daltons, specifically about 10,000 to about 100,000 Daltons, more specifically about 20,000 Daltons to about 80,000 Daltons.

Figure 2:
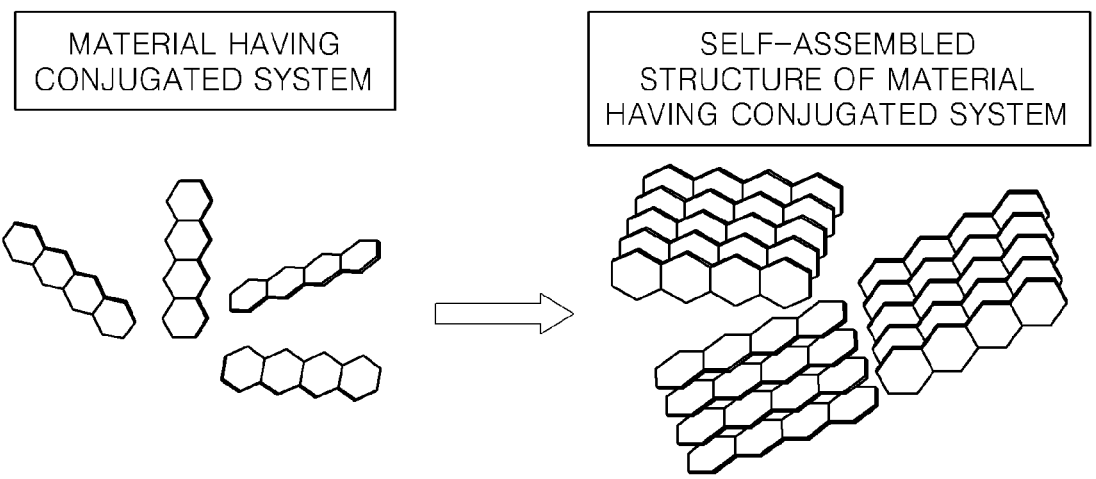
FIG. 2 is a schematic view of an exemplary embodiment of a self-assembled structure of an organic material having a conjugated system.
Figure 3:
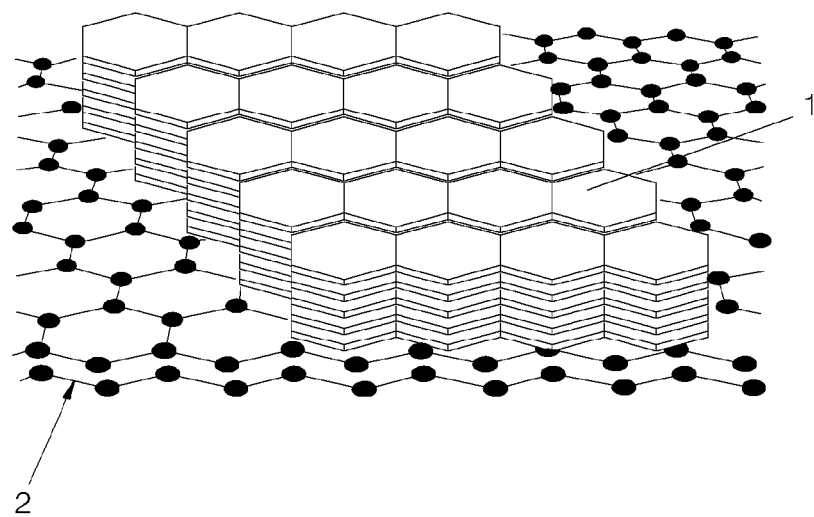
FIG. 3 is a schematic view illustrating an exemplary embodiment of a self-assembled structure of an organic material having a conjugated system disposed on graphene.

The organic material having the conjugated system, which includes a delocalized π electron system, may form a self-assembled structure, as illustrated in FIG. 2. The organic material having the conjugated system 1 may form a layered structure having a selected thickness on the graphene 2 by self-assembly, as illustrated in FIG. 3.

As described above, when formed on the graphene, the layer comprising the organic material having the conjugated system may be more likely to be oriented in the face-on structure due to the π-π interaction. As a result, the efficiency of charge transport at the interface between the graphene and the organic material having the conjugated system is increased, thereby reducing the interfacial resistance. Due to the reduced interfacial resistance, various electrical devices, such as a light emitting diode ("LED"), a solar cell, or a power device, may have an improved efficiency when including the layered structure comprising the graphene and the organic material having the conjugated system.

The layered structure comprising graphene and the organic material having the conjugated system may be formed on various substrates. For example the substrate may comprise a metal, a metalloid, or an insulator, or a combination thereof. In an embodiment the substrate may have a stacked substrate comprising a metal, a metalloid, or an insulator, or a combination thereof. The substrate may comprise an inorganic material and the inorganic material may be, for example, selected from silicon (Si), a glass, GaN, silica, indium tin oxide ("ITO"), and a combination thereof. In an embodiment the substrate may be a stacked substrate comprising any of the foregoing materials. For example, the substrate may comprise a silicon layer and a silica layer stacked upon one another. In another embodiment, the substrate may comprise an organic material, for example, a plastic material. The metal may be at least one selected from nickel, copper and tungsten, and a combination thereof.

The layered structure comprising the graphene and the organic material having the conjugated structure may be prepared as follows.

The graphene may be prepared according to a method which would be known to one of skill in the art without undue experimentation, such as a method disclosed in Korean Patent Application Publication No. 2009-0043418, the content of which in its entirety is herein incorporated by reference. The graphene may have a surface having an area of equal to or greater than 1 square millimeter ($mm^2$), specifically an area of about 1 $mm^2$ to about 100 $m^2$, more specifically an area of about 1 $mm^2$ to about 25 $m^2$. Graphene may occupy equal to or greater than about 99 percent (%) of a selected area of the graphene, specifically about 99% to about 99.999% of a selected area, more specifically about 99.9% to about 99.99% of a selected area. The graphene may have a purity of about 99% to about 99.9999%, specifically about 99.9% to about 99.999%, more specifically about 99.99%. If graphene is present in the foregoing range, the graphene may be homogeneous, and thus may have uniform electrical characteristics.

The organic material having the conjugated system may be disposed (e.g., layered) on the prepared graphene by coating a solution containing the organic material on the graphene by using spin coating, dip coating, spray coating, printing, or using a doctor blade method. In a particular embodiment, the organic material having the conjugated system may be disposed using spin coating. A solution of a soluble high-molecular weight organic material or soluble low-molecular weight organic material having a conjugated system may be dissolved in a solvent, and then spin-coated on the graphene to form the layer comprising the organic material having the conjugated system with, for example, a self-assembled structure. Examples of the solvent for dissolving the organic material having the conjugated system include, but are not limited to, chlorobenzene, dichlorobenzene, chloroform, toluene, or a combination comprising at least one of the foregoing. The concentration of the solution of the organic material having the conjugated system may be about 0.1 milligrams per milliliter (mg/ml) to about 50 mg/ml, specifically about 0.5 mg/ml to about 25 mg/ml, more specifically about 1 mg/ml to about 10 mg/ml. The spin coating may be performed at about 100 revolutions per minute (rpm) to about 5,000 rpm, specifically at about 200 rpm to about 2,500 rpm, more specifically at about 400 to about 1,200 rpm.

Alternatively, after the graphene is disposed (e.g., grown) on a substrate selected from the substrates listed above, the organic material having the conjugated system may be disposed (e.g., layered) thereon.

According to another aspect, an organic low-molecular weight material having a conjugated system may be disposed (e.g., layered) on the graphene by vapor deposition, or for example, by vacuum deposition under conditions effective to form the layer comprising the organic material.

The layered structure comprising the graphene and the organic material having the conjugated system has an improved charge transport efficiency, and thus may be useful for, for example, a solar cell, a nano generator, an LED, or organic light-emitting device ("OLED").

Hereinafter, one or more embodiments will be disclosed in further detail with reference to the following examples. However, these examples are not intended to limit the scope of the one or more embodiments.

Example 1

A solution of 4 mg of poly(3-hexylthiophene) ("P3HT"), which was the polythiophene used as an organic material having a conjugated system, dissolved in 0.5 ml of chlorobenzene was spin-coated on a graphene having a thickness of 5 nanometers (nm) and a size of 1.2 centimeters (cm) by 1.0 cm at 2000 rpm to form a layered structure comprising the graphene and the organic material having the conjugated system. The basal plane of the graphene was the (0001) plane.

Comparative Example 1

A solution of 4 mg of P3HT, which was the polythiophene used as a polymer material having a conjugated system, dissolved in 0.5 ml of chlorobenzene was spin-coated on an indium tin oxide ("ITO") substrate having a thickness of 150 nm and a size of 1.2 cm by 1.0 cm at 2000 rpm to form a layered structure comprising the ITO and the polymer having the conjugated system.

Experimental Example

Figure 4:
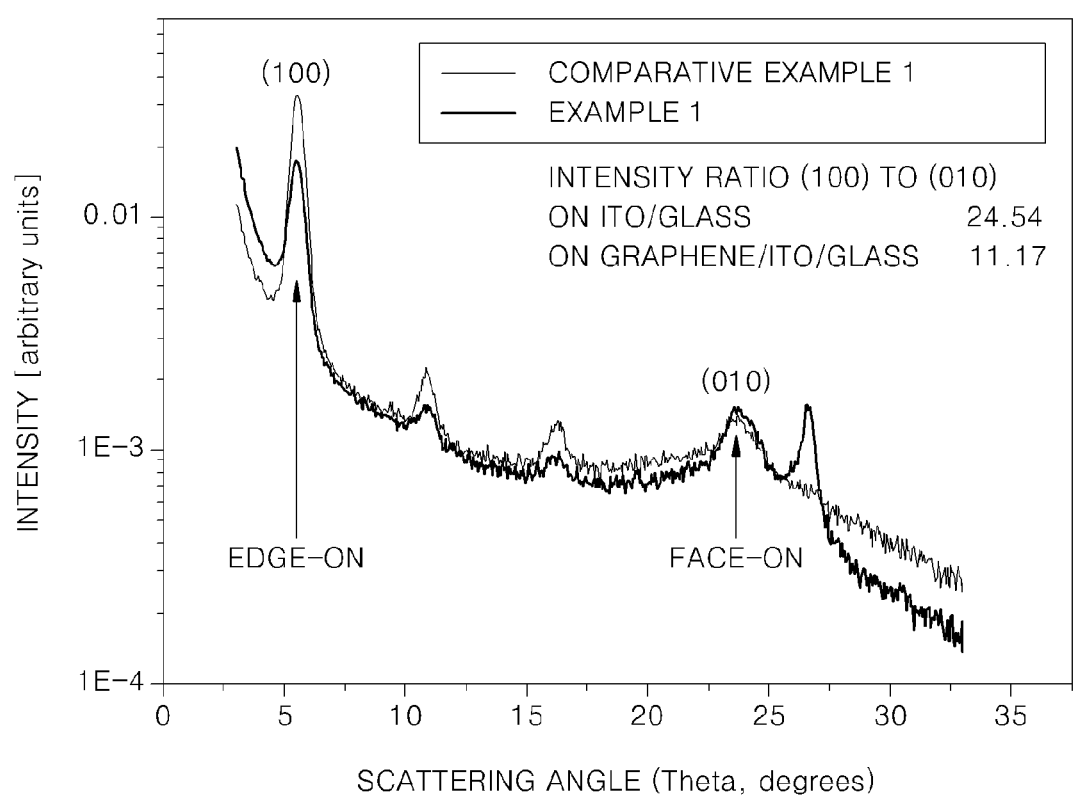
FIG. 4 is a graph of intensity (arbitrary units, "a.u.") versus scattering angle (theta, degrees) showing the results of out-of-plane glancing angle X-ray diffraction ("GIXRD") analysis on the layered structures of Example 1 and Comparative Example 2.

The orientations of P3HT layers formed in Example 1 and Comparative Example 1 were analyzed by out-of-plane glancing incidence X-ray diffraction ("XRD") analysis. The results are shown in FIG. 4. Referring to FIG. 4, the P3HT layer of Comparative Example 1 formed directly on the ITO included both edge-on orientation ((100) peak, 11.17 degrees) and face-on orientation ((010) peak, 24.54 degrees) structures. However, the P3HT layer in the layered structure of Example 1, i.e., formed directly on the graphene, included less edge-on orientation but more face-on orientation structures as compared to the structure of Comparative Example 1.

Figure 5:
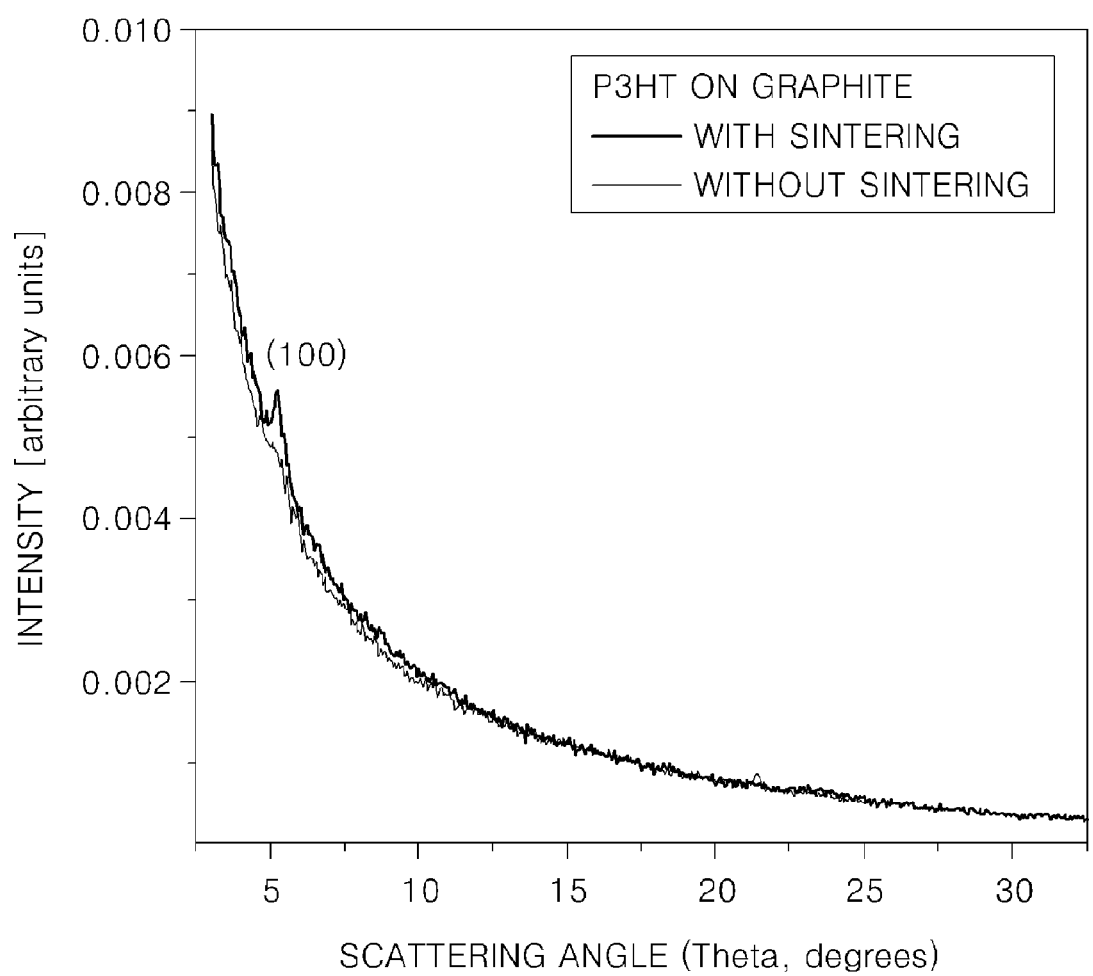
FIG. 5 is a graph of intensity (arbitrary units, "a.u.") versus scattering angle (two theta, degrees) showing the results of in-plane GIXRD analysis on P3HT layers respectively grown on ITO and monocrystalline graphite.

FIG. 5 is a graph showing the results of in-plane GIXRD analysis of P3HT layers respectively grown on the layered structures of monocrystalline graphite/ITO, wherein only the P3HT layer on one of the layered structures was thermally treated for the analysis. As shown in FIG. 5, the thermally treated P3HT layer is more inclined to have face-on orientation than the P3HT layer that was not thermally treated.

However, as compared to the XRD analysis result on the P3HT layer of Comparative Example 1 formed directly on the ITO, in the in-plane GIXRD curve peak positions (angles) appeared in both the samples to be opposite to the peaks in the XRD curve of FIG. 4. In particular, the P3HT layers on the layered structures of monocrystalline graphite/ITO had face-on peaks at 11.17 degrees, but did not have edge-on peaks, which indicates that the P3HT layers grown on the monocrystalline graphite have face-on orientation.

As described above, according to the one or more of the above embodiments, a layered structure comprising graphene and an organic material having a conjugated system contains fewer interfacial defects, and thus has a lower interfacial resistance. Thus, the charge transport efficiency may be increased. Furthermore, because the graphene is economically efficient, the disclosed layered structure may be applied to various electric devices, for example, an LED, a solar cell, or a power generating device.

It shall be understood that the exemplary embodiments disclosed herein are to be considered in a descriptive sense only and not for purposes of limitation. Descriptions of features or aspects within each embodiment should be considered as available for other similar features or aspects in other embodiments.

What is claimed is:

1. A layered structure, comprising:
graphene, wherein a basal plane of the graphene is a (0001) plane; and
a layer comprising an organic material having a conjugated system disposed on the graphene,
wherein the layer comprising the organic material having the conjugated system is bound to the (0001) plane of the graphene by a π-π interaction, and wherein an amount of a face-on orientation of the organic material is greater than an amount of an edge-on orientation of the organic material.

2. The layered structure of claim 1, wherein the layer comprising the organic material having the conjugated system has a face-on orientation in which a π electron band of the organic material is oriented parallel to the basal plane of the graphene.

3. The layered structure of claim 1, wherein the layer comprising the organic material having the conjugated system has a face-on orientation in which a π electron band of the organic material is oriented parallel to a (0001) plane of the graphene.

4. The layered structure of claim 1, wherein the layer comprising the organic material layer having the conjugated system comprises a self-assembled structure comprising the organic material having the conjugated system.

5. The layered structure of claim 1, wherein the organic material having the conjugated system comprises a π electron system delocalized along a polymeric backbone thereof.

6. The layered structure of claim 1, wherein the organic material having the conjugated system comprises at least one organic material selected from phthalocyanine, pentacene, oligothiophene, polythiophene, and polyphenylene.

7. The layered structure of claim 1, wherein the graphene has a sheet form comprising a surface having an area of equal to or greater than about 1 square millimeter.

8. The layered material of claim 1, wherein the organic material is poly(3-hexylthiophene).

9. An electrical device comprising a layered structure, wherein the layered structure comprises:

graphene, wherein a basal plane of the graphene is a (0001) plane; and a layer comprising an organic material having a conjugated system disposed on the graphene, wherein the layer comprising the organic material layer having the conjugated system is bound to the (0001) plane of the graphene by a π-π interaction, and wherein an amount of a face-on orientation of the organic material is greater than an amount of an edge-on orientation of the organic material.

10. A method of preparing a layered structure comprising graphene wherein a basal plane of the graphene is a (0001) plane, and a layer comprising an organic material having a conjugated system, the method comprising:

coating a solution comprising the organic material having the conjugated system onto the graphene, to form the layer comprising the organic material having the conjugated system, wherein the layer comprising the organic material having the conjugated system is bound to the (0001) plane of the graphene by a π-π interaction, and wherein an amount of a face-on orientation of the organic material is greater than an amount of an edge-on orientation of the organic material.

11. The method of preparing a layered structure of claim 10, wherein the coating comprises spin coating, dip coating, spraying, printing or a doctor blade method.

12. A method of preparing a layered structure comprising graphene wherein a basal plane of the graphene is a (0001) plane, and a layer comprising an organic material having a conjugated system, the method comprising:

vapor-depositing an organic precursor material having molecular weight of 100-1,000 daltons on the graphene under conditions effective to form the layer comprising the organic material having the conjugated system, wherein the layer comprising the organic having the conjugated system is bound to the (0001) plane of the graphene by a π-π interaction, and wherein an amount of a face-on orientation of the organic material is greater than an amount of an edge-on orientation of the organic material.

* * * * *